US009715676B2

(12) United States Patent
Bahar

(10) Patent No.: US 9,715,676 B2
(45) Date of Patent: Jul. 25, 2017

(54) METHOD AND SYSTEM FOR CONFIRMING PROPER RECEIPT OF E-MAIL TRANSMITTED VIA A COMMUNICATIONS NETWORK

(76) Inventor: Reuben Bahar, West Hills, CA (US)

( * ) Notice: Subject to any disclaimer, the term of this patent is extended or adjusted under 35 U.S.C. 154(b) by 1291 days.

(21) Appl. No.: 09/978,224

(22) Filed: Oct. 16, 2001

(65) Prior Publication Data

US 2002/0019852 A1 Feb. 14, 2002

Related U.S. Application Data

(63) Continuation-in-part of application No. 09/460,531, filed on Dec. 15, 1999, now abandoned.

(51) Int. Cl.
*H04L 12/58* (2006.01)
*G06Q 10/10* (2012.01)

(52) U.S. Cl.
CPC ........... *G06Q 10/107* (2013.01); *H04L 51/30* (2013.01)

(58) Field of Classification Search
USPC .................................. 709/202, 206, 217, 245
See application file for complete search history.

(56) References Cited

U.S. PATENT DOCUMENTS

| | | | | |
|---|---|---|---|---|
| 5,509,071 A | * | 4/1996 | Petrie, Jr. et al. | 705/53 |
| 5,748,738 A | * | 5/1998 | Bisbee | G06Q 20/00 380/30 |
| 5,793,972 A | * | 8/1998 | Shane | G06F 17/30893 705/14.4 |
| 6,052,468 A | * | 4/2000 | Hillhouse | H04L 9/0891 380/281 |
| 6,092,192 A | * | 7/2000 | Kanevsky | G06F 21/32 382/115 |
| 6,289,372 B1 | * | 9/2001 | Vyaznikov | H04L 12/1868 707/999.201 |
| 6,618,747 B1 | * | 9/2003 | Flynn | G06Q 10/107 709/203 |

(Continued)

*Primary Examiner* — Asghar Bilgrami
(74) *Attorney, Agent, or Firm* — Cahill Glazer PLC

(57) ABSTRACT

A method and system for confirming proper receipt of an e-mail file sent by a sending party over a communications network such as the Internet and intended to be received by a target party. The e-mail file sent by the sending party is properly or improperly delivered to a recipient e-mail address and stored in a data storage location of a recipient computer system. When the accessing party, who may or may not be the intended target party, accesses either the e-mail file itself or an e-mail processing program or user account, various recipient information, including identity information associated with the accessing party, is discovered from the recipient computer system and included in a generated confirmation of receipt notice. The confirmation of receipt notice is subsequently and automatically return transmitted to the sending party. In one embodiment, an attachment file is transmitted together with the e-mail which operates to discover and obtain the recipient data, generate the confirmation of receipt notice, and transmit the confirmation of receipt notice to the sending party. In this manner, the sending party can determine whether the accessing party who actually received and was notified of the e-mail file was in fact the intended target party, and thereby determine whether delivery was proper.

94 Claims, 5 Drawing Sheets

(56) References Cited

U.S. PATENT DOCUMENTS

| | | | |
|---|---|---|---|
| 6,629,131 B1* | 9/2003 | Choi | H04L 51/30 |
| | | | 379/93.01 |
| 6,725,381 B1* | 4/2004 | Smith | H04L 51/24 |
| | | | 713/168 |
| 6,836,846 B1* | 12/2004 | Kanevsky | H04L 51/18 |
| | | | 707/999.009 |
| 7,003,117 B2* | 2/2006 | Kacker | H04L 63/0442 |
| | | | 380/277 |
| 2001/0011350 A1* | 8/2001 | Zabetian | 713/176 |
| 2004/0249817 A1* | 12/2004 | Liu | H04L 63/0428 |

* cited by examiner

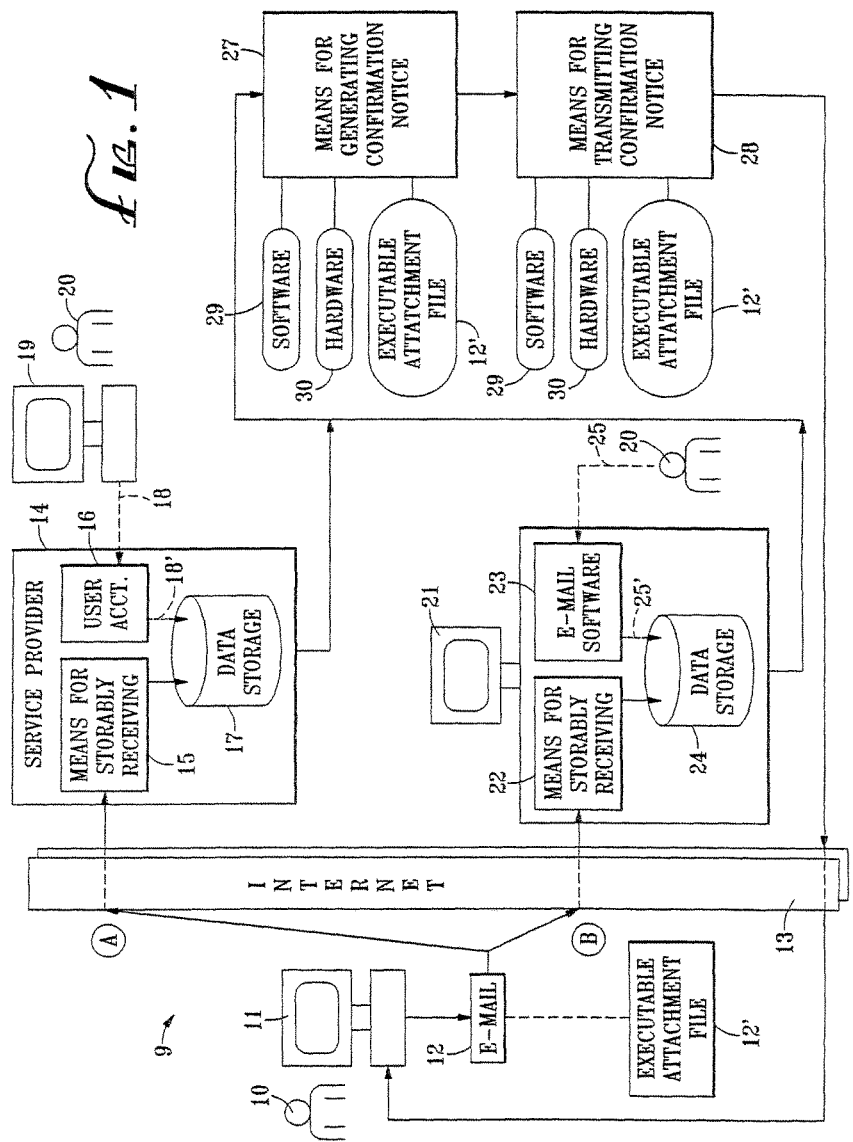

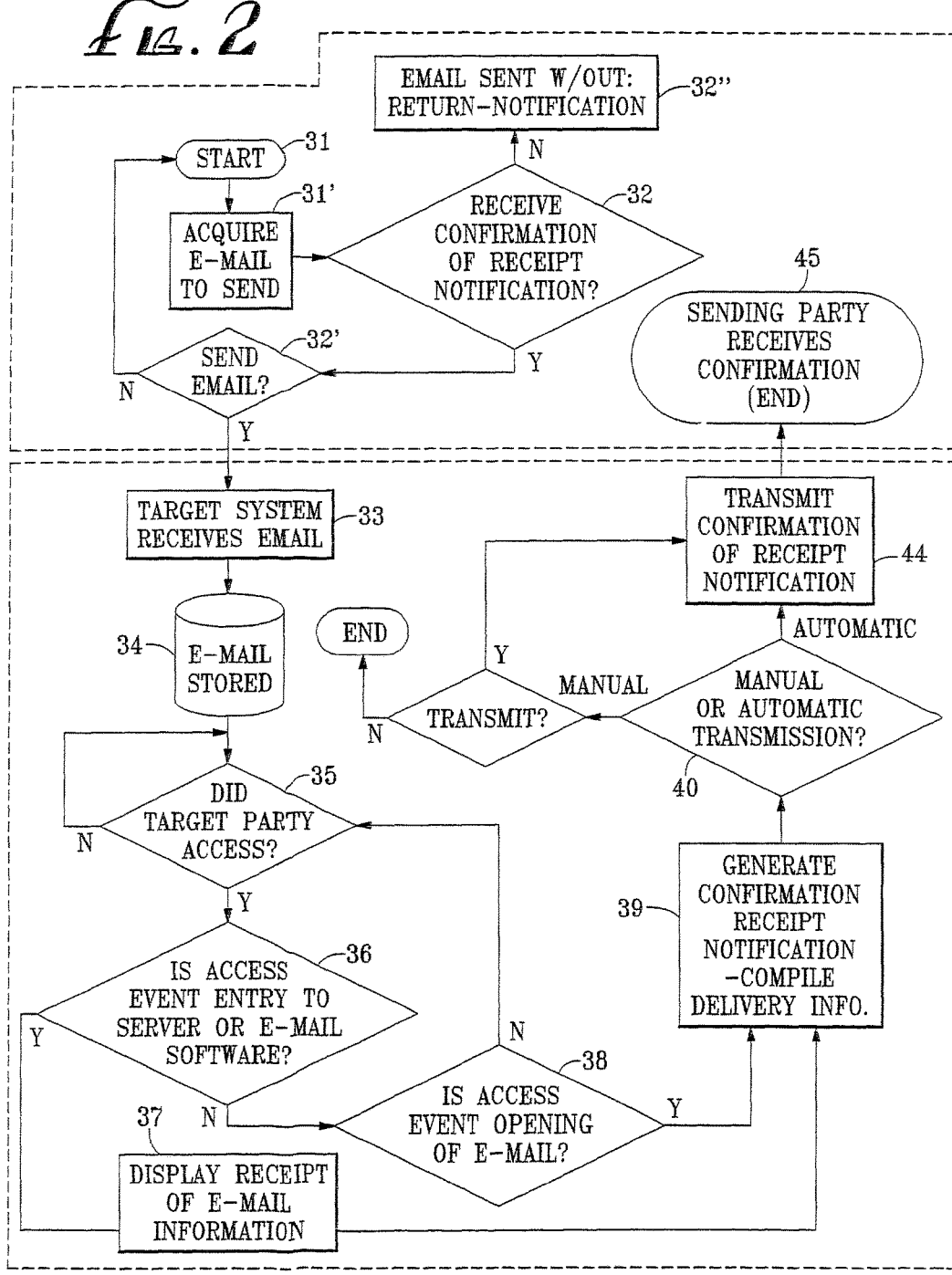

CONFIRMATION OF RECEIPT NOTICE

47 — NAME OF INTENDED TARGET PARTY: REUBEN BAHAR — 48

49 — INTENDED ACCOUNT E-MAIL WAS SENT TO: reubenbahar@hotmail.com — 50

51 — ACCOUNT E-MAIL WAS ACCESSED FROM: reubenbahar@hotmail.com — 51'

52 — E-MAIL ACCESSED BY: REUBEN BAHAR — 52'

53 {
COMPANY OF ACCESSING PARTY: ABC CORPORATION

ACCESS LOCATION ADDRESS: 23708 WELBY WAY, WEST HILLS, Ca 91307

PHONE NUMBER OF ACCESS LOCATION: (818) 555-2222

ACCESS TIME: 15:02 HRS

ACCESS DATE: 7/12/99
}

*FIG. 3*

CONFIRMATION OF RECEIPT NOTICE

55 — NAME OF INTENDED TARGET PARTY: REUBEN BAHAR —56

57 — INTENDED ACCOUNT E-MAIL WAS SENT TO: reubenbahar@hotmail.com —58

59 — ACCOUNT E-MAIL WAS ACCESSED FROM: mike smith@msn.com —59'

60 — E-MAIL ACCESSED BY: MIKE SMITH —60'

COMPANY OF ACCESSING PARTY: XYZ CORPORATION

ACCESS LOCATION ADDRESS: 665 EAST 43$^{RD}$ STREET, NY, NY 10028

61 — PHONE NUMBER OF ACCESS LOCATION: (212) 545-6868

ACCESS TIME: 08:09 HRS

ACCESS DATE: 9/8/99

*FIG. 4*

METHOD AND SYSTEM FOR CONFIRMING PROPER RECEIPT OF E-MAIL TRANSMITTED VIA A COMMUNICATIONS NETWORK

This is a continuation-in-part of application Ser. No. 09/460,531, filed Sep. 15, 1999 now abandoned.

BACKGROUND OF THE INVENTION

The field of the invention generally relates to receipt confirmation methods and systems. The invention relates more particularly to a method and system for confirming proper receipt of electronic mail ("e-mail") intended by a sending party for transmission to a target e-mail address of a target party. The e-mail is properly or improperly delivered to a recipient e-mail address, wherein information associated with the recipient e-mail address, such as the identity of an accessing party, is automatically discovered and transmitted to the sending party when a designated access event is triggered by an accessing party.

Many significant developments have been made in recent years in a variety of communications mediums. In particular, the development of the Internet, localized intranets, and similarly network-based communications has made interconnectivity and networking possible on both a local as well as global scale. Moreover, with the growth of online communications networks, various devices and methods have been developed to facilitate as well as promote online communication and means for conducting business. One recent development has been the creation of e-mail which allows users to electronically send and receive various forms of analog or digitized data, including text, graphics, video, sounds, etc. almost anywhere, and virtually instantaneously. In recent years, e-mail has grown tremendously in popularity, and has gained widespread use throughout the world.

Unfortunately, however, e-mail does not yet afford users the same sense of security and reliability in delivery as other more traditional communications mediums, such as mail delivered by the postal system. It is often frustrating to find that an e-mail message thought to be properly delivered, was never received by the intended target recipient because of an unknown system error or malfunction. In such a case, the e-mail may even have been delivered to an unintended party as a result of the system error. Additionally, in the case where e-mail is properly delivered to the target party's e-mail address, actual receipt and notice by the intended target party may have been prevented due to access by unauthorized individuals or other unforeseen circumstances. These scenarios are particularly devastating when important documents and materials transmitted over the Internet are involved and are never received. Especially in these cases, therefore, it is essential that the sending party verify and receive confirmation that the e-mail was properly delivered to the intended e-mail address, and that the intended target party actually received and was notified of the e-mail delivery.

Traditionally, receipt confirmation of documents and materials sent via the postal system has been through signature request on a paper return receipt at the point of physical delivery. This technique, often used by mail service delivery agents, confirms completed delivery at the target address or location and is intended to provide the sender with a measure of security and some evidence that the sent materials were in fact delivered to the proper address. However, the disadvantage of this traditional method of receipt confirmation is that it can be time-consuming, ineffective, and disproportionately expensive, especially in light of the expanding prevalence of the Internet as a global communications medium. Moreover, while a recipients signature is typically required upon delivery, the signature alone does not provide dispositive confirmation that an intended target individual actually received or was notified of the delivery, particularly in a household or place of business with many people.

One particular method of receipt confirmation has been widely used on the Internet, particularly in the electronic greeting card industry. For example, when an electronic greeting card is chosen from a website by a sending party for delivery to a target recipient, an e-mail message is typically sent to the target recipient in lieu of the greeting card itself. The e-mail message notifies the target recipient that an electronic greeting card awaits him/her at the website. When the target recipient accesses the greeting card at the designated website, a confirmation receipt e-mail message is automatically generated by the greeting card service and sent to the sending party who has previously provided his return e-mail address. While this particular method provides a certain level of reliability that the intended target recipient accessed and viewed the card, it is uncertain that the target recipient will acknowledge the greeting card at all by actually visiting the designated Internet website. Only with the target recipients cooperation would a receipt confirmation be generated and sent back to the sending party. Additionally, because this form of Internet delivery confirmation requires the participation of a third party service provider functioning as an intermediary, delivery and confirmation is indirect and relatively inefficient, especially since direct communication and delivery is readily available to all e-mail users. Moreover, this method of receipt confirmation also does not positively identify the individual or entity that actually accessed the e-mail or the location (e-mail account or geographic address) from which it was accessed.

Receipt confirmation of directly transmitted e-mail deliveries between e-mail users is presently possible by manual return e-mail confirmation. This typically requires a series of additional actions to be taken by the target recipient, i.e. by independently writing a separate confirmation e-mail. Again, however, the success of this method requires the participation and cooperation of the recipient to confirm receipt of a delivered e-mail. Without the recipient party's cooperation, it is uncertain in most cases whether a particular e-mail was properly delivered to the correct e-mail address, or whether the proper target party accessed or was notified of the e-mail. Even in situations where e-mail is properly delivered to a target party's "inbox," i.e. a logical destination where new e-mail is placed prior to opening, there is typically no evidence to indicate that the target party actually opened to view the e-mail or confirm notice. The target party may discriminately choose to open and view certain e-mails received while never opening and examining the contents of others. This would be particularly problematic in situations where proof of service with notice is required, such as service of jury duty summons, or other legal and court documents. It would also pose a problem in other situations which are unlikely to elicit cooperation from the intended recipient.

In summary, therefore, it would be advantageous to afford the sending party a means for confirming receipt of the e-mail which is substantially beyond the control of the recipient party. Furthermore, it would be advantageous to actively determine the identity of the recipient individual actually receiving and/or given notice of the e-mail, as well as other actively discovered information indicative of proper delivery which is found on the recipient computer system of the recipient individual.

BRIEF SUMMARY OF THE INVENTION

It is therefore an object of the present invention to provide a prompt and reliable method and system for confirming proper receipt of e-mail transmitted over a communications network, such as the Internet.

It is a further object of the present invention to provide a prompt and reliable method and system which affords a party sending e-mail a greater sense of security that an e-mail was in fact delivered to and accessed by a target party by return-receiving a confirmation of receipt notice which confirms or denies actual notice and receipt by the intended target party of the delivered e-mail.

It is a still further object of the present invention to actively and positively identify the individual who accesses the delivered e-mail and the location from which it was accessed by discovering recipient information related to a recipient e-mail address, such as identity information of the accessing party as well as the recipient e-mail address.

The present invention is for a method and system for confirming proper receipt of e-mail transmitted over a communications network. In a first preferred embodiment, the present invention is a method comprising the following steps. First, an e-mail file is obtained by a sending party and intended for transmission to a target e-mail address associated with a target party. Next, the e-mail file is electronically transmitted from a first computer which is connected to the communications network and associated with the sending party. Next, the e-mail is properly or improperly delivered to a recipient e-mail address associated with a second computer connected to the communications network. Next, a designated access event is detected when it is triggered by the accessing party. The access event is generally associated with e-mail retrieval from the recipient e-mail address, and can include, for example, when the accessing party gains access to the second computer or the recipient e-mail address, or when the accessing party opens the e-mail file itself. In any event, the following steps are automatically executed upon detection of the access event. They include: (1) providing notice of the delivered e-mail file to the accessing party, (2) discovering recipient data which is generally associated with the recipient e-mail address, (3) generating a confirmation of receipt notice containing the discovered recipient data, and (4) electronically transmitting the confirmation of receipt notice from the second computer to a return e-mail address associated with the sending party. Preferably, the discovering step includes access event data associated with the designated access event, such as identity information of the accessing party. Moreover, the discovering step preferably also includes retrieving an accessing party data file containing accessing party identity information which was previously obtained from the accessing party as a requisite condition for either 1) accessing the second computer or the recipient e-mail address, or 2) operating a remote user computer connected to the second computer via the communications network. And finally, the recipient data contained in the confirmation of receipt notice is compared with intended delivery information associated with the intended target party. In this manner, the sending party may determine whether the e-mail file was properly delivered or not.

In a second preferred embodiment of the present invention, the general method discussed above further comprises the step of obtaining access event data of attendant conditions of the access event upon detection of the access event. Furthermore, the steps of providing notice of the delivered e-mail file, generating the confirmation of receipt notice, and electronically transmitting the confirmation of receipt notice are all conditioned upon first obtaining the access event data. Preferably, the access event data is obtained by interactively requesting and receiving input from the accessing party.

And in a still third preferred embodiment of the present invention, a system is provided for confirming proper receipt of e-mail. The system comprises an e-mail file intended by a sending party for electronic transmission to a target e-mail address associated with a target party. Additionally, the system includes a first computer connected to the communications network and from which the sending party may electronically transmit the e-mail file. A second computer is also included which is connected to the communications network and associated with a recipient e-mail address. The second computer has a data storage location for storably receiving the e-mail file thereon upon delivery to the recipient e-mail address. The system also comprises first executable software means for detecting a designated access event which is triggered by an accessing party and is generally associated with e-mail retrieval from the recipient e-mail address. Additionally, a second executable software means of the system provides notice of the delivered e-mail file to the accessing party. The system also has third executable software means for discovering recipient data which is associated with the recipient e-mail address. For example, the recipient data may include pre-recorded registered recipient information resident in the second computer, or identity information of an accessing party actually being notified of and/or viewing the e-mail file. Additionally, the system includes fourth executable software means for generating a confirmation of receipt notice which contains the recipient data. A fifth executable software means is also included for electronically transmitting the confirmation of receipt notice from the second computer to a return e-mail address associated with the sending party. The aforementioned second, third, fourth, and fifth executable software means are all automatically initiated upon occurrence of an access event caused by the accessing party and detected by the first executable software means. In this manner, an examination of the confirmation of receipt notice by the sending party enables the sending party to comparatively determine whether the e-mail was in fact properly delivered to the intended target party.

BRIEF DESCRIPTION OF THE DRAWINGS

FIG. 1 is an overview flowchart depicting the flow of information that occurs between the sending party and the recipient or accessing party in the method and system of confirming proper receipt of e-mail according to the present invention.

FIG. 2 is a block diagram of an illustrative e-mail transmission and confirmation of receipt notice retrieval procedure which occurs in the method and system of the present invention.

FIG. 3 is an example of a confirmation of receipt notice which confirms proper delivery of the transmitted e-mail file to the correct location and proper access by the intended target party.

FIG. 4 is an example of a confirmation of receipt notice which indicates improper delivery of the transmitted e-mail file to the wrong location due to a system or other error and improper access by a non-intended accessing party.

DETAILED DESCRIPTION OF THE PREFERRED EMBODIMENTS

Figure 5:
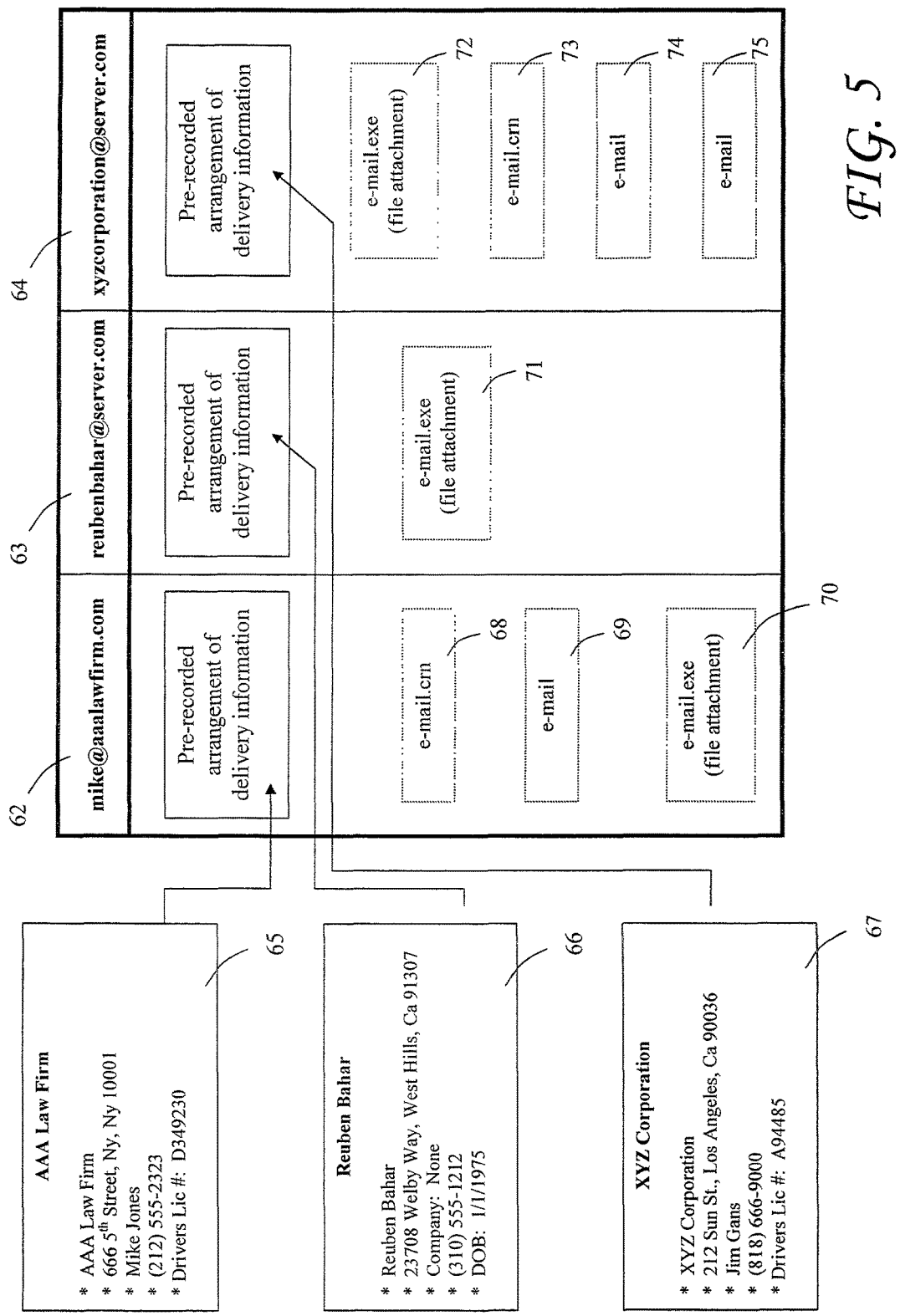
FIG. 5 is an overview diagram depicting one embodiment for discovering delivery information associated with the accessing party who actually accesses and is given notice of the delivered e-mail file.

Referring now to the drawings, FIGS. 1 and 2 together show the information flow that occurs in a method and system 9 (hereinafter "system") for confirming proper receipt of e-mail transmitted via a communications network, such as the Internet 13. In particular, FIG. 1 shows an overview flowchart pictorially depicting the general transmission flow of information, i.e. and e-mail file 12, between a sending party 10 and a recipient or accessing party 20. And FIG. 2 shows in block diagram form an illustrative procedure of e-mail transmission and confirmation of receipt notice retrieval which occurs between the sending party 10 and the accessing party 20 according to the present invention.

It is initially important to appreciate that the sending party 10 transmitting the e-mail file 12 does so with the intent that it be transmitted to a pre-determined target e-mail address associated with a target party and located on a target computer system. It is further appreciated, however, that the recipient e-mail address and account to which the e-mail file 12 is actually delivered may or may not be the intended target e-mail address and account. Likewise, the accessing party actually receiving and/or given notice of the transmitted e-mail may or may not be the intended target party. The recipient or accessing party 20 is defined as the individual, whether authorized or not, who actually receives and is given notice of the delivered e-mail, such as by opening and accessing the delivered e-mail. In the case of proper e-mail delivery, the accessing party 20, the recipient e-mail address, and the associated recipient system (14, 21 in FIG. 1) are in fact the intended target party, target e-mail address and target system, respectively, as originally intended by the sending party 10. And in the case of improper delivery, the accessing party 20 is a non-intended third party not designated by the sending party 10 for receipt. It is appreciated that FIGS. 1 and 2 do not make this distinction. Instead, FIGS. 1 and 2 together illustrate the case of general transmission and delivery of e-mail to the recipient e-mail address and account which is associated with and located on a recipient computer system, irrespective of whether the e-mail file was properly or improperly delivered to the recipient e-mail address.

As can be seen in FIG. 1, the Internet 13 links together the sending party 10 and the accessing party 20 to enable the transfer of information between them, or with anyone also connected to the Internet 13. Although the Internet 13 is used exclusively in the present discussion, it is understood to represent but one form of a communications network. Thus, all references to the Internet 13 are appreciated to generally indicate all forms of communications networks capable of transmitting and receiving data, preferably digital data, which allows users of the network to communicate. In this regard, a communications network includes, but is not limited to, all telecommunications networks such as the Internet, i.e. the World Wide Web and BBS systems, hard-wire telephony, wireless networks including cellular and PCS systems, satellite networks, etc. Furthermore, communications networks include localized and regional networks such as intranets and local area network (LAN) systems which interconnect a relatively few number of user systems or terminals, typically by means of a centralized server.

As shown in FIG. 1, the sending party 10 first obtains an e-mail file 12 with the intent to send it to a target party using a computer system 11 connected to the Internet 13. The e-mail file 12 can be acquired by either creating the e-mail file 12 with a suitable e-mail generating software, or selecting an existing e-mail file 12 for forwarding. An executable attachment file 12', i.e. a relatively small program, may also be created and transmitted along with the e-mail file 12 (see discussion below). It is appreciated that while e-mail such as the e-mail file 12 is most often understood to comprise electronic text messages transmitted via the Internet 13, analogous to a letter delivered by the postal system, it is not limited only to such. The term "e-mail" and "e-mail file" is broadly defined and used herein and in the claims to mean any encoded information containing text, graphics, sound, video, etc. which is transmitted electronically, by analog or digital means, over a communications network, typically the Internet 13. Thus, e-mail can also include all electronic transmissions of analog or digital information which are transmitted and delivered over a communications network, such as file transfer protocol (ftp) transmissions, hypertext transfer protocol (http) transmissions, facsimiles, voice messages, etc.

By connecting to the Internet 13, the sending party 10 can electronically transmit the acquired e-mail file 12. As shown by arrows A and B in FIG. 1, the transmission path of the e-mail file 12 to the accessing party 20 depends on where and what type of computer system a registered user of the recipient e-mail address has designated as his recipient computer system, i.e. the destination computer system to which e-mails to the accessing party 20 are delivered and stored. Typically, the registered user effectively designates a particular recipient computer system by choosing from among a wide range of service providers with whom the registered users registers to receive an e-mail address and account.

In a first preferred embodiment, as shown in FIG. 1, the recipient computer system is a computer server 14 of a service provider capable of processing e-mail for multiple users. For example, the service provider can be an Internet service provider (ISP), such as the online service offered under the trademark "America Online." Alternatively, the service provider can be an e-mail service provider (EMSP), such as the online e-mail service offered under the trademark "Hotmail." Furthermore, the server 14 can be a server of an intranet or LAN system which networks a plurality of user terminals (e.g. 19) or workstations together. In this last scenario, it is appreciated that the LAN server can either be a stand alone server system or one of the networked computer workstations or user terminals 19. Moreover, the LAN server can itself be connected to the Internet to centrally provide Internet access to each networked computer workstation or user system.

For these server-type recipient computer systems 14, a user account, e.g. a system or e-mail account 16, is typically provided to the registered user. ISPs typically provide their users with a designated user account 16 and an e-mail address associated with the user account, as well as providing access to the Internet. It is notable here that "e-mail address," as used herein and in the claims, is broadly defined as both the address label of the e-mail/user account, and the e-mail/user account itself. Thus "e-mail address" and "e-mail/user" account are used interchangeably throughout this discussion. EMSPs also provide their registered users with a user account 16 and an e-mail address associated with the account, but do not provide access to the Internet. Thus users retrieving e-mail from an EMSP must do so by first connecting to the Internet via an ISP and accessing their designated user accounts. And similar to the servers operated by ISPs or EMSPs, LAN servers also typically provide a user account 16 to the accessing party 20 whereby only authorized personnel gaining access to their user accounts can access shared resources. In all the above situations, incoming e-mail directed to a particular e-mail address, such as the e-mail file 12, are logged and saved under the designated user account 16, which is accessible by password or confidential code entry. Furthermore, to access a user account provided by an ISP or EMSP, the accessing party 20 typically uses a remote user computer 19 to connect directly to the ISP server, or to the EMSP server via an ISP. It is notable here that while the registered user is the original entity having authorized access to the e-mail address, it is the accessing party 20 who gains access to the e-mail address/account, whether authorized or unauthorized, and triggers an access event of the present invention as will be discussed in detail below. Furthermore, the registered user and the accessing party 20 are not mutually exclusive, with one individual capable of assuming both identities.

Alternatively, the recipient computer system can be a simple user computer system 21 directly accessible by the accessing party 20. The user system 21 is preferably a personal computer system, which is typically connectable to the Internet via an ISP, or to an intranet as per a LAN system, as discussed above. And e-mail is delivered directly to the user computer. In this scenario, accessing the user computer system 21 and the delivered e-mail requires only that the accessing party 20 power on and directly access the user computer system 21, without having to access a secondary site such as in the server-type systems 14 described above.

In either case, however, the recipient computer system 14, 21 has data storage means 17, 24, typically a hard disk drive, having a storage medium capable of reading and writing data thereon, such as the delivered e-mail 12. Further, the recipient computer system 14, 21 has means for storably receiving e-mail 15, 22 on the data storage means 17, 24, which is typically a computer software program. It is notable that the data receiving process for most server 14 and user systems 21 inherently involves writing or storing data, i.e. e-mail, on the data storage means 17, 24 as it is being received.

Upon delivery of the e-mail file 12 to the data storage means 17, 24 of the recipient computer system 14, 21, the system 9 operates to detect a designated access event 18, 18', 25, 26 triggered by the accessing party 20 and generally associated with e-mail retrieval from the recipient e-mail address. Thus the access event may include any action taken by the accessing party 20 leading to the opening and viewing of the delivered e-mail, including opening and viewing the delivered e-mail itself. For example, in a first embodiment involving the server-type system 14, and denoted by the path indicated by arrow A, the access event can occur upon accessing the server system 14 which is typically accomplished by logging into 18 the user account 16 containing the delivered e-mail 12. The access event can also occur upon opening 18' the delivered e-mail file 12 subsequent to logging into 18 the user account, e.g. e-mail account 16 of an EMSP. Typically, because logging into a user account 16 requires a password or confidential access code, a sufficient degree of security is generally provided to ensure that an individual actually logging on is in fact the accessing party 20. However, it should be noted that alternative means of identity verification upon access, such as fingerprint, DNA, retina scan verification, or biometrics technology (e.g. face recognition), would provide a greater measure of security in ascertaining the identify of the individual actually causing the access event (see discussion below). In a second embodiment involving the user system 21, and denoted by the path indicated by arrow B, the access event can similarly occur upon the activation 25 of an e-mail processing software 23 installed on the user system 21. Alternatively, the access event can occur by opening 26 the delivered e-mail file 12 itself subsequent to activation 25 of the e-mail processing software 23.

Upon detecting the access event triggered by the accessing party 20, a series of operations is automatically executed to generate and ultimately transmit a confirmation of receipt notice to the sending party 10. As shown in FIG. 1, this is preferably accomplished by means for generating 27 (preferably including means for informing the accessing party of the delivered e-mail file, and means for discovering recipient data), and means for transmitting 28, both of which are preferably embodied either as modules of a receipt confirmation software 29 installed on the recipient systems 14, 21, or as hardware components 30 also installed on the recipient systems 14, 21. Additionally, in one particular embodiment involving the server-type target system 14, both the means for generating 27 and the means for transmitting 28 are installed on the user terminal 19 as either modules of a receipt confirmation software 29 or as hardware components 30.

Alternatively, and in another embodiment, the means for generating 27 and means for transmitting 28 (as well as means for informing and means for discovering) are executable modules of an executable attachment file 12' transmitted together with the e-mail file 12. The executable attachment file 12' is preferably a suitably small program capable of self-activating typically by double-clicking the e-mail file 12. The executable attachment file 12' preferably has a module for discovering recipient data associated with the recipient e-mail address, a module for generating the confirmation of receipt notice containing the recipient data, and a module for transmitting the confirmation of receipt notice to a return e-mail address designated by the sending party 10 to receive the confirmation of receipt notice.

Additionally, where the access event is other than the direct opening of the e-mail file 12, the attachment file 12' may also include a module for detecting the designated access event. The detection module would preferably be executed automatically upon delivery to the recipient e-mail address, in order to immediately wait for and detect the access event. It is appreciated that if opening of the e-mail file 12 is designated as the access event, then directly opening the e-mail file is itself an inherent detection of the access event which does not require a separate detection module. Furthermore, where the access event is again other than the direct opening of the e-mail file 12, the attachment file preferably also includes a module for providing notice of the delivered e-mail to the accessing party 20. Again, it is appreciated that opening of the e-mail file itself will inherently provide notice to the accessing party of the delivery and contents of the e-mail file 12. Generally, however, each of these modules self-execute upon occurrence of the access event, as will be discussed in greater detail of each step.

In a preferred embodiment, another executable software module is provided which makes a first determination, prior to the step of detecting the access event, of whether generation and transmission of a confirmation of receipt notice is warranted. The module is preferably resident as part of resident software in the recipient system prior to the delivery of the e-mail file 12. And this determination is preferably made by identifying an e-mail file as a particular file-type requiring a confirmation of receipt notice, and thus requiring a further detection step of the access event. Similar to the discussion above, it is appreciated that if opening of the e-mail file 12 is designated as the access event, then directly opening the e-mail file is itself an inherent detection of the access event which does not require a separate detection module of the resident software of the recipient computer system.

E-mail which is designated for generating a confirmation of receipt notice is preferably differentiated from e-mail without such designation by means of the executable attachment file 12' to the e-mail or a distinct file extension of the e-mail. For example, where the e-mail file 12 has an executable attachment file 12', merely accessing that e-mail file 12 will automatically initiate the steps for generating the confirmation of receipt notice (as mentioned above). Additionally, a particular e-mail may be labeled with a distinct file extension to identify the file as one requiring a confirmation of receipt notice. As an illustrative example, the file extension acronym of ".crn" (confirmation of receipt notice) may be used for recognition by the recipient system in order to execute the detection step.

Turning now to each of the steps which are executed upon detection of the access event 18, 18', 25, 26, arguably one of the most important features of the access event is providing notice of the delivered e-mail to the accessing party 20. While this may be inherently accomplished in the case of opening the delivered e-mail file itself, this is typically not the case for other access events, such as accessing the recipient e-mail address or associated recipient computer 18, 25. These other designated access events may require an additional step of providing sufficient notice because access to the user account 16 or the e-mail processing software 23 will not typically notify the presence and/or contents of the e-mail to the accessing party 20. This is important because many cases require at least notification of the e-mail delivery to a target party, especially those involving legal documents. In many of those situations, however, the recipient may be unwilling to cooperate with the sending party 10 in returning a confirmation of receipt reply. Therefore, the means for generating 27 shown in FIG. 1 would preferably include means for informing the accessing party 20 of the delivered e-mail 12. It is notable that informing the accessing party 20 would be accomplished either by informing the accessing party 20 of the presence of the e-mail 12, or by opening the e-mail 12 to exhibit the contents of the e-mail, either partially or in its entirety. Moreover, as discussed previously, the executable attachment file 12' may also include a module for providing notice of the delivered e-mail file to the accessing party 20 upon detection of the access event. Additionally, upon detection of the access event 18, 18', 25, 26, the system 9 also initiates the step of discovering or otherwise obtaining recipient data, typically from the recipient computer system, for inclusion in a confirmation of receipt notice (see FIGS. 3, 4). It is notable that the discovering steps involves actively searching for recipient data in target locations typically associated with such recipient data, such as for example the recipient system. The discovering step is preferably accomplished in conjunction with the means for generating a confirmation of receipt notice 27, with the generated confirmation of receipt notice having the recipient data contained therein. Moreover, the discovering step includes the compilation of various recipient data associated with the recipient e-mail address, including identity information of a registered user of the recipient e-mail address. Additionally, the recipient data may also include access event data of attendant conditions of the designated access event. The access event data may include, but is not limited to, time and date of access, recipient e-mail address of the account where the e-mail was accessed, geographic address of the location where the access event occurred, telephone number of the location where the access event occurred, data indicating information about the terminal used to trigger the access event (e.g. that the terminal has been activated by a user(s) using a security code such as a password, fingerprint, genetic or retina imprint), and especially the identity of the accessing party 20 (e.g. first and last name, age, date of birth, drivers license number, company name, etc.), etc. Discovering or obtaining the identity of the individual actually causing the access event 18, 18', 25, 26 would be particularly advantageous where the target party is a business or organizational entity, and employees or other personnel receive important e-mail on its behalf. Such important information can include credit card account information, social security number, confidential memos, business documents such as contracts and bids, and legal documents such as subpoenas, summons and complaint notices, jury duty notices, etc. Moreover, ascertaining the identity of the individual actually causing the access event would provide additional proof of actual receipt of the e-mail 12. For this purpose, it is contemplated that suitable means of identification verification for access known in the relevant art would be used in conjunction with the present invention, such as access upon fingerprint verification, genetic (DNA) verification, retina scan verification, biometrics technology (e.g. face recognition), etc. Such verified identification information is preferably obtained in one embodiment by compiling such information from the recipient computer system or the accessing party's system during the generation of the confirmation of receipt notice as discussed above.

In a first preferred embodiment of the discovering step, the system 9 retrieves a pre-recorded recipient data file from the recipient computer system 14, 21 containing pre-recorded recipient data. The pre-recorded recipient data is preferably information associated with a registered user to whom the recipient e-mail address/account are registered. As discussed previously, the registered user is not necessarily the accessing party 10. The pre-recorded recipient data is typically pre-recorded and resident on the recipient computer system substantially prior to access by the accessing party 20, and often recorded by administrative personnel associated with the management of the recipient e-mail address and account. Additionally, the pre-recorded recipient data may be entered by the registered user at the moment of creation of the recipient account or a similarly early point in time. In any case, upon detecting the access event 18, 18', 25, 26, the pre-recorded recipient data file is retrieved from the recipient computer system for inclusion in the confirmation of receipt notice (see discussion below).

FIG. 5 illustrates three sample recipient e-mail addresses/accounts: "mike@aaalawfirm.com" 62, "reubenbahar@server.com" 63, and "xyzcorporation@server.com" 64, all containing e-mail messages delivered to respective recipient computer systems. It is notable that each of the recipient e-mail accounts 62-64 has stored therein a corresponding pre-recorded arrangement of delivery information 65-67, respectively, i.e. the pre-recorded recipient data file relating to the specific user of each of the accounts. As shown, each of the particular pre-recorded arrangements of delivery information 65-67 contains identity data that distinctly identifies the registered recipient party who has proper authorization to access the respective accounts 62-64. Upon detection of the access event on an e-mail for which a confirmation of receipt notice was requested, the pre-recorded recipient data corresponding to a particular user account is discovered for inclusion in the confirmation of receipt notice. For example, detecting access events independently associated with e-mails 68 or 70 will result in retrieval of the pre-recorded recipient data 65 which corresponds to e-mail user account 62. Similarly, triggering an access event associated with e-mail 71 will result in retrieval of the pre-recorded recipient data 66 which corresponds to e-mail user account 63. And finally, an access event associated with e-mail 72 or 73 will result in the retrieval of the pre-recorded recipient data 67 which corresponds to e-mail user account 64. It should be mentioned that an access event is not associated with e-mails 69, 74, and 75 and will not therefore result in discovery and recording of the pre-recorded recipient data corresponding to the respective user accounts since those e-mails were not designated by the sending party 10 to generate a confirmation of receipt notice message. This is the case since e-mails 69, 74, and 75 do not have a distinct file extension or an executable file attachment which identify the e-mail as a file-type requiring the confirmation of receipt notice.

Alternatively, another method of obtaining recipient data, particularly access event data, involves interactively requesting and receiving input from the accessing party 20. In one embodiment, such a step is implemented and required to be completed as a condition for executing the subsequent steps of discovering recipient data, generating the confirmation of receipt notice, and transmitting the confirmation of receipt notice. Thus, for example, when the designated access event is designated as the opening of the e-mail file 12, double-clicking the e-mail file 12 will typically trigger an on-screen request prompting the accessing party to input various information, such as the identity of the accessing party 20. Similarly, when the designated access event is designated as the log-in access of the recipient e-mail address or account, an on-screen request prompts the accessing party 20 to input information in order to gain entry, as well as to execute the subsequent steps of providing notice of the e-mail and generating the confirmation of receipt notice.

In a still alternative embodiment, accessing party information is obtained prior to the designated access event as a requisite condition for gaining access or entry to a recipient e-mail address or account. Such information requirement is typically implemented via accessing party identifying software which is resident on the recipient computer system 14, 21. The obtained accessing party information is then recorded to an accessing party data file (not shown) for resident storage in the recipient computer system 14, 21. With the accessing party data file resident in the recipient computer system 14, 21, it is retrieved therefrom upon detection of the access event as part of the step of obtaining access event data. A similar process of recording and later retrieving an accessing party data file is implemented where the accessing party 20 remote accesses the recipient e-mail address or account from a remote user computer (e.g. 19 in FIG. 1) which is remote connected to the recipient computer system 14, 21 via the communications network. In this particular embodiment, accessing party information is obtained as a required step to operating the remote user computer, such as is typical of some LAN systems restricted to only authorized persons. Here too a software program resident on the remote user computer is typically utilized to perform the collection of information. The accessing party information is then recorded to an accessing party data file for resident storage in the remote user computer. And upon triggering and detection of the designated access event, the accessing party data file is remote retrieved from the remote user computer.

Additionally, in yet another embodiment, information pertaining to the accessing party is obtained by electronically tapping the remote connection in a process known to those skilled in the relevant art (such as that employed in caller identification). Upon the triggering and detection of the access event, an electronic tapping or tracing sequence would automatically initiate through the use of hardware and or software means preferably resident on the recipient computer system 14. It is appreciated that electronic tapping is possible by virtue of the telephone or other communications connection between the recipient computer system 14 and the remote user computer 19, and that the electronic tapping process obtains remote access information associated with the remote connection.

It is contemplated that various suitable means for precisely identifying the accessing party known in the relevant art could be used in conjunction with the present invention. These may include, but are not limited to, verification of access based upon fingerprint identification, genetic (DNA) identification, retina scan identification, biometrics technology (e.g. face recognition), or a computer generated user code. Such information may be used in lieu of a password as a means of gaining access to either a computer or online account given its "one of a kind" imprint. Where this information (e.g. fingerprint) is used to gain access to a computer terminal, it is preferably recorded on that terminal's data registry so as to match potential user's with authorized ones. Thus, once the e-mail 12 is accessed, the discovery process preferably searches the accessing party's computer registry and retrieves the resident imprint information. Conversely, when imprint information is entered on the spot by a user trying to gain access to e-mail 12, the discovery process preferably detects and record it the moment it is entered. Given the unique signature inherent in ones fingerprint, genetics, retina, and face, acquiring such information virtually ensures the correct identification of the person actually causing the access event.

It is noteworthy that in many situations, a user may not want their fingerprint, genetic, retina imprint, or even password revealed to an outside party. In these instances the user's personal security code (e.g. fingerprint, genetic, retina imprint, password) would be associated with the user's identity information, (e.g. name, address, phone number, etc.). For example, a user may input their fingerprint into a computer terminal in order to gain access to that terminal. After the user's fingerprint is recognized by the terminal, the user identity information that is associated with that particular fingerprint will be recorded on the terminal's retrievable data registry instead of the user's fingerprint. Upon the occurrence of an access event, the user information would be retrieved from the terminal's data registry, in accordance with the discovery process. For this process to occur, it is, of course, understood that the user's identity information would have to be pre-programmed into the user terminal and directly associated with the user's personal security code (e.g. fingerprint). Since a particular collection of user identity information would only be responsive to a distinct user security code (e.g. fingerprint), discovery of the user information in this instance would work to positively identify the user of the terminal causing the access event.

The discovered and otherwise obtained recipient data and access event data is subsequently included in a confirmation of receipt notice which is preferably generated by a selfexecuting module upon the detection of the access event, or upon additionally obtaining access event data. As can be seen in FIGS. 3 and 4, two examples of confirmation of receipt notices are shown. In particular, FIG. 3 shows a confirmation of receipt notice 46 which confirms that an e-mail file was delivered to the correct recipient e-mail address 50. The first line 47 reiterates the intended target party, e.g. Reuben Bahar 48, and the second line 49 reiterates the intended target e-mail address, e.g. reubenbahar@hotmail.com 50. The third line 51 identifies the recipient e-mail address information, e.g. reubenbahar@hotmail.com 51' which was discovered upon the access event. And the fourth line 52 identifies the identity of the accessing party, e.g. Reuben Bahar 51', who actually received the e-mail file. Thus, the first 47 and fourth 52 lines are compared with each other, and the second 49 and third 51 lines are compared with each other, to determine equivalency. Additional lines of access information, designated at reference character 53, is shown providing additional access event data associated with the access event and the accessing party, such as access location, phone number of access location, and the time and date of the access event. Notably, the confirmation of receipt notice 46 provides the phone number of the physical location from which the e-mail was accessed, preferably by the electronically tapping process discussed above. And FIG. 4 illustrates a confirmation of receipt notice 54 for an e-mail file which was delivered to a wrong location due to some system or other error. As can be seen, while the first line 55 lists the identity of intended target party, e.g. Reuben Bahar 56, the fourth line 60 indicates that the access event was triggered by a Mike Smith 60'. Further indication is provided of misdirected delivery by comparing the second line 57 of the intended target e-mail address and the third line 59 of the location from which the e-mail was accessed. The additional access event data indicated at reference character 61 operates to further confirm that the e-mail was improperly delivered.

After the confirmation of receipt notice is generated, it is transmitted to a return e-mail address designated by the sending party 10 to receive the confirmation of receipt notice. This is typically accomplished using the means for transmitting 28 in FIG. 1, which can be either an executable module of an e-mail attachment file or a resident program sequence, as discussed earlier. As can be seen in FIG. 1, following the generation of the confirmation of receipt notice 27, the notice is transmitted, by means for transmitting 28, to the sending party 10 at a designated location, typically the sending partys e-mail inbox. And upon receiving the confirmation of receipt notice by the sending party 10, the sending party 10 compares the recipient data and access event data contained therein with intended target information, such as the intended target party and the intended target e-mail address, to ascertain the delivery conditions. A determination is then made whether proper delivery was effected by the e-mail transmission. And in this manner, the discovered and otherwise obtained recipient data or access event data provides evidence of correct or misdirected delivery of the e-mail file 12. Misdirection or improper access would be evident where the actual recipient system or e-mail address differs from the intended target system or e-mail address, or if there was unauthorized access at a properly delivered e-mail destination.

FIG. 2 shows a block diagram illustrating a preferred depiction of the method and system 9 discussed above. Starting from the block 31, the sending party acquires an e-mail (not shown in FIG. 2) to send to the recipient party at block 31', either by creating a new e-mail or using an existing e-mail for forwarding. At block 32, the sending party decides whether to utilize the confirmation of receipt system 9 or transmit the e-mail 12 without receipt notification. If the confirmation of receipt notice is not desired, the e-mail 12 is sent by traditional means for e-mail delivery, at block 32", without utilizing the system 9. If a confirmation of receipt notice is desired, the e-mail 12 may be transmitted at block 32' by the sending party 10. If yes, the target system then receives the e-mail at block 33, which simultaneously stores it into the data storage means in block 34.

Next, at block 35 the system 9 determines whether the access event occurred which was caused by the recipient party. If not, the e-mail will remain stored until the recipient party accesses the recipient computer system. If yes, at block 36 the system 9 determines whether the access event was caused by the recipient party accessing either the server or the e-mail processing software. If yes, information notifying the recipient party of the e-mail's presence is preferably displayed on the screen, as shown in block 37. The display can be a simple notice of the contents and/or title of the e-mail, or a complete opening and viewing of the entire contents. If not, at block 38 the system 9 determines whether the access event was caused by the recipient party accessing the delivered e-mail itself. If not, the system 9 returns to block 35.

If so, however, at block 39 the contents of the accessed e-mail is displayed to the accessing party and the system 9 generates the confirmation of receipt notice in preparation for delivery to the sending party 10. During this process, delivery information pertaining to the access event is discovered from the recipient computer system, as discussed previously, and included in the confirmation of receipt notice. Block 39 is likewise reached following block 37.

At block 40, the system 9 determines whether the manual or automatic transmission option was pre-designated by the sending party. If the automatic transmission option was chosen, the confirmation of receipt notice is automatically transmitted to the sending party 10 at block 44. If the manual transmission option was chosen by the sending party 10, at block 41 the recipient party is prompted whether a confirmation of receipt notice is to be return transmitted to the sending party 10. If at block 41 the recipient party chooses not to transmit the confirmation of receipt notice, the system ends at block 43. If yes, at block 44 the system transmits the confirmation of receipt notice back to the sending party 10, and the sending party 10 receives the confirmation of receipt notice at block 45. Upon receiving the confirmation of receipt notice at block 45, the sending party may compare the identity of the accessing party with that of the originally intended target party to determine if delivery of the e-mail was proper. It is notable here that though the above discussion provides a manual transmission option giving the recipient party the choice of not transmitting the confirmation of receipt notice back to the sending party, the sending party will typically have pre-designated the automatic transmission option in order to maintain full control of the return receipt process and ensure the receipt of a confirmation of receipt notice.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A method for identifying a party accessing an e-mail sent by a sending party to an intended recipient, said method comprising:
   a) receiving an e-mail at a recipient e-mail address;
   b) detecting an access event by the accessing party;
   c) requiring the accessing party associated with said access event to input identifying data prior to allowing the requested access, said identifying data identifying the accessing party associated with said requested access;
   d) receiving the identifying data associated with the accessing party;
   e) permitting said e-mail to be accessed when the identifying data received from the accessing party identifies the intended recipient; and
   f) permitting said e-mail to be accessed when the identifying data received from the accessing party does not identify the intended recipient.

2. The method as in claim 1, wherein said access event comprises access of said e-mail that was delivered to said recipient e-mail address.

3. The method as in claim 1, wherein said access event comprises access of an e-mail account associated with said recipient e-mail address.

4. The method as in claim 1, wherein said access event comprises activation of an e-mail processing software associated with said recipient e-mail address.

5. The method as in claim 1, wherein the step of receiving an e-mail from the sending party includes receiving an executable attachment file in conjunction with the e-mail, the executable attachment file having a first module for requesting entry of recipient data from the party who requested said access event; and wherein the step of detecting an access event includes the step of executing the first module of the executable attachment file.

6. The method as in claim 5, wherein the executable attachment file has a second module transmitted and delivered therewith, the second module for detecting the access event, and further comprising the step of automatically executing the second module upon delivery of the attachment file to the recipient e-mail address.

7. The method as in claim 1, wherein said recipient e-mail address is associated with a recipient computer.

8. The method as in claim 7, wherein said recipient computer is a server of a service provider.

9. The method as in claim 7, wherein said recipient computer is a user system that is directly accessible by a recipient, said user system including electronic mail processing software.

10. The method as in claim 1, wherein said inputted identifying data pertains to alphanumeric text identification, biometric identification, password identification, a computer generated user code, or a combination thereof.

11. The method as in claim 1, wherein said inputted identifying data comprises identity information that identifies an individual.

12. The method as in claim 11, wherein said identity information pertains to biometric identification.

13. The method as in claim 12 further comprising the step of recognizing biometric attributes of an individual.

14. The method as in claim 11, wherein said identity information includes alphanumeric text identification information.

15. The method as in claim 1, wherein said identifying data comprises information that identifies a business.

16. The method as in claim 1, wherein said identifying data comprises information that identifies an organization.

17. The method as in claim 1, wherein said identifying data comprises a computer generated user code.

18. The method as in claim 1 further including the step of sending access event data of attendant conditions of said access event.

19. The method as in claim 1, wherein said accessing party is an individual.

20. The method as in claim 1, wherein said accessing party is a business.

21. The method as in claim 1, wherein said accessing party is an organization.

22. The method as in claim 1, wherein said identifying data is used to verify proper delivery of legal documents.

23. The method as in claim 1, wherein said identifying data is used to verify proper delivery of confidential documents.

24. The method recited by claim 1 further including the step of generating a confirmation of receipt notice wherein the inputted identifying data is included with said confirmation of receipt notice and wherein said notice can be compared to information associated with said intended recipient in order to verify whether the e-mail was accessed by the intended recipient.

25. The method of claim 24, wherein said confirmation of receipt notice is sent to an e-mail address.

26. The method as in claim 1, wherein said identifying data is sent to an e-mail address.

27. The method as in claim 1, wherein a remote user computer may be used to gain remote access to said recipient e-mail address.

28. The method as in claim 1 wherein identifying data associated with said accessing party comprises information that identifies an individual.

29. The method as in claim 1 wherein identifying data associated with said accessing party comprises information that identifies a business.

30. The method as in claim 1 wherein identifying data associated with said accessing party comprises information that identifies an organization.

31. The method as recited in claim 1 further including the step of sending identifying data relating to the accessing party associated with said access event to identify the party who accessed said e-mail.

32. A system for of identifying a party accessing an e-mail sent by a sending party to an intended recipient, said system comprising:
   a) a recipient computer connected to a communications network, said recipient computer capable of receiving an e-mail and further having data storage for storing said received e-mail; and
   b) software on a non-transitory computer storage medium capable of detecting an access event, wherein, upon detecting said access event, said software requiring the party associated with said access event to input recipient data prior to allowing the requested access, said recipient data comprising identifying data identifying the party associated with said requested access, and wherein:
      i) said software permits said e-mail to be accessed after said recipient data is received when the recipient data received from the party associated with said access event identifies the intended recipient, and
      ii) said software further permits said e-mail to be accessed after said recipient data is received when the recipient data received from the party associated with said access event does not identify the intended recipient.

33. The system as in claim 32, wherein said access event comprises access of said received email.

34. The system as in claim 32, wherein said access event comprises access of an e-mail account associated with the e-mail address to which said e-mail was delivered.

35. The system as in claim 32, wherein said access event comprises activation of e-mail processing software associated with the e-mail address to which said e-mail was delivered.

36. The system as in claim 32, wherein said identifying data for identifying the party who accessed said e-mail is sent to an e-mail address.

37. The system as in claim 32, wherein said access event comprises access of said e-mail account that is associated with said recipient computer.

38. The system as in claim 32, wherein said access event comprises activation of an e-mail processing software associated with the e-mail address to which said e-mail was delivered.

39. The system as in claim 32, wherein said received e-mail further includes an executable attachment file in conjunction with the e-mail, the executable attachment file having a first module for requesting entry of recipient data from the party who requested said access event; and wherein, upon detection of an access event, the first module of the executable attachment file is executed.

40. The system as in claim 39, wherein the executable attachment file has a second module transmitted and delivered therewith, the second module for detecting the access event, the second module being automatically executed upon delivery of the attachment file to the e-mail address to which said e-mail was delivered.

41. The system as in claim 32, wherein said recipient computer is a server of a service provider.

42. The system as in claim 32, wherein said recipient computer is a user system that is directly accessible by a recipient, said user system including electronic mail processing software.

43. The system as in claim 32, wherein said recipient data pertains to alphanumeric text identification, biometric identification, password identification, a computer generate user code, or a combination thereof.

44. The system as in claim 32, wherein said recipient data pertains to biometric identification, said system including a biometric identifier for recognizing biometric attributes of an individual.

45. The system as in claim 32, wherein said recipient data comprises information that identifies a business.

46. The system as in claim 32, wherein said recipient data comprises information that identifies an organization.

47. The system as in claim 32, wherein said recipient data comprises information that identifies an individual.

48. The system as in claim 32 wherein said recipient computer is capable of generating a confirmation of receipt notice which includes said recipient data, and wherein said notice can be compared to information associated with said intended recipient in order to verify whether the e-mail was accessed by the intended recipient.

49. A system for identifying a party accessing an e-mail sent by a sending party to an intended recipient, said system comprising:
   a) a recipient computer connected to a communications network, said recipient computer being capable of receiving an e-mail and further having data storage for storing said received email;
   b) a biometric identifier for recognizing biometric attributes of an individual; and
   c) software on a non-transitory computer storage medium capable of detecting an access event and identifying an individual associated with said access event through utilization of inputted biometric attributes of said individual;
      i) wherein said software permits said e-mail to be accessed after receipt of said biometric attributes of the individual associated with said access event when the biometric attributes received from said individual identify the intended recipient; and
      ii) wherein said software permits said e-mail to be accessed after receipt of said biometric attributes of the individual associated with said access event when the biometric attributes received from said individual do not identify the intended recipient.

50. The system as in claim 49, wherein said access event comprises access of a delivered email.

51. The system as in claim 49, wherein said access event comprises access of an e-mail account associated with the e-mail address to which said e-mail was delivered.

52. The system as in claim 49, wherein said access event comprises activation of e-mail processing software associated with the e-mail address to which said e-mail was delivered.

53. The system as in claim 49, wherein said access event comprises access of an e-mail delivered to said recipient computer.

54. The system as in claim 49, wherein said access event comprises access of an e-mail account associated with said recipient computer.

55. The system as in claim 49, wherein said access event comprises activation of an e-mail processing software associated with the computer to which said e-mail was delivered.

56. The system as in claim 49 further including an executable attachment file associated with an email message received by the recipient computer, the executable attachment file having a first module for requesting entry of biometric attributes from the party who requested said access event; and wherein, upon detection of an access event, the first module of the executable attachment file is executed.

57. The system as in claim 56, wherein the executable attachment file has a second module for detecting the access event, the second module being automatically executed upon delivery of the executable attachment file to the e-mail address to which said e-mail was delivered.

58. The system as in claim 49, wherein said recipient computer is a server of a service provider.

59. The system as in claim 49, wherein said recipient computer is a user system that is directly accessible by a recipient, said user system including electronic mail processing software.

60. The system as in claim 49 wherein said biometric attributes are associated with alphanumeric text.

61. The system as in claim 49, wherein said biometric attributes comprise information that identifies a person associated with a business.

62. The system as in claim 49, wherein said biometric attributes comprise information that identifies a person associated with an organization.

63. The system as in claim 49, wherein said biometric attributes comprise information that identifies an individual.

64. The system as in claim 49, wherein identification data that is related to said biometric attributes is sent to an e-mail address.

65. The system as in claim 49 wherein said recipient computer is capable of generating a confirmation of receipt notice wherein identifying data related to the biometric attributes of the individual associated with said access event is included with said confirmation of receipt notice and wherein said notice can be compared to information associated with said intended recipient in order to verify whether the e-mail was accessed by the intended recipient.

66. A method for identifying a party accessing an e-mail sent by a sending party to an intended recipient, said method comprising:
 a) receiving an e-mail at a recipient e-mail address;
 b) detecting an access event by the accessing party:
 c) requiring the accessing party that requested said access to input identifying data prior to allowing the requested access, said identifying data identifying the accessing party;
 d) receiving the identifying data;
 e) permitting said e-mail to be accessed when the identifying data received from the accessing party identifies the intended recipient;
 f) permitting said e-mail to be accessed when the identifying data received from the accessing party does not identify the intended recipient; and
 g) sending identifying data relating to the accessing party that requested said access to identify the party who accessed said e-mail.

67. The method as recited in claim 66 wherein said step of sending identifying data further includes the step of generating a confirmation of receipt notice wherein the inputted identifying data is included with said confirmation of receipt notice and wherein said notice can be compared to information associated with said intended recipient in order to verify whether the e-mail was accessed by the intended recipient.

68. The method as in claim 67, wherein said confirmation of receipt notice is sent to an email address.

69. The method as in claim 66 wherein said identifying data is sent to an e-mail address.

70. The method as in claim 66, wherein said inputted identifying data pertains to alphanumeric text identification, biometric identification, password identification, a computer generated user code, or a combination thereof.

71. The method as in claim 66, wherein said access event comprises access of said e-mail that was delivered to said recipient e-mail address.

72. The method as in claim 66, wherein said access event comprises access of an e-mail account associated with said recipient e-mail address.

73. A method for identifying a party accessing an e-mail sent by a sending party to an intended recipient, said method comprising:
 a) receiving an e-mail at a recipient e-mail address;
 b) detecting an access event by an accessing party;
 c) acquiring recipient data from said accessing party that is related to biometric identification of the accessing party;
 d) receiving the recipient data;
 e) permitting said e-mail to be accessed when the recipient data received from said accessing party identifies the intended recipient;
 f) permitting said e-mail to be accessed when the recipient data received from said accessing party does not identify the intended recipient; and
 g) sending identifying data related to biometric identification of said accessing party for identifying the accessing party.

74. The method recited by claim 73 wherein said step of sending identifying data includes the step of generating a confirmation of receipt notice which includes said identifying data, and wherein said notice can be compared to information associated with said intended recipient in order to verify whether the email was accessed by the intended recipient.

75. The method as in claim 74, wherein said confirmation of receipt notice is sent to an email address.

76. The method as in claim 73, wherein said access event comprises access of said e-mail that was delivered to said recipient e-mail address.

77. The method as in claim 73, wherein said access event comprises access of an e-mail account associated with said recipient e-mail address.

78. The method as in claim 73, wherein the recipient data that identifies said accessing party includes alphanumeric text, said alphanumeric text being associated with at least one biometric attribute of said accessing party.

79. The method as recited in claim 73 wherein said identifying data is sent to an e-mail address.

80. A method for identifying a party accessing an e-mail sent by a sending party to an intended recipient, said method comprising:
 a) receiving an e-mail at a recipient e-mail address;
 b) identifying an accessing party utilizing biometric identification;
 c) detecting an access event by the accessing party;
 d) receiving identifying data associated with said biometric identification of said accessing party;
 e) permitting said e-mail to be when the received identifying data identifies the intended recipient;
 f) permitting said e-mail to be accessed when the received identifying data does not identify the intended recipient; and
 g) sending said identifying data for identifying the accessing party.

81. The method as recited in claim 80 wherein said step of sending identifying data includes the step of generating a confirmation of receipt notice which includes said identifying data for comparison to information associated with the intended recipient in order to verify whether the e-mail was accessed by the intended recipient.

82. The method as recited in claim 81 wherein said confirmation of receipt notice is sent to an e-mail address.

83. The method as in claim 80 wherein said data that identifies said accessing party is sent to an e-mail address.

84. The method as in claim 80, wherein said data that identifies said accessing party includes alphanumeric text, said alphanumeric text being associated with at least one biometric attribute of said accessing party.

85. A method for identifying a party accessing an e-mail sent by a sending party to an intended recipient, said method comprising:
 a) receiving an e-mail at a recipient e-mail address;
 b) identifying an accessing party in association with biometric identification;
 c) detecting an access event by the accessing party;
 d) receiving identifying data related to said biometric identification of said accessing party;
 e) permitting said e-mail to be accessed when the received identifying data identifies the intended recipient; and
 f) permitting said e-mail to be accessed when the received identifying data does not identify the intended recipient.

86. The method recited by claim 85 further including the step of generating a confirmation of receipt notice wherein the data that identifies the accessing party is included with said confirmation of receipt notice and wherein said notice can be compared to information associated with said intended recipient in order to verify whether the email was accessed by the intended recipient.

87. The method as in claim 86, wherein said confirmation of receipt notice is sent to an email address.

88. The method as in claim 85, wherein the data that identifies said accessing party is comprised of alphanumeric text, said alphanumeric text being associated with at least one biometric attribute of said accessing party.

89. The method as in claim 85, further including the step of recognizing biometric attributes of an individual.

90. The method as in claim 85, wherein said data that identifies said accessing party comprises identity information that identifies an individual.

91. The method as in claim 85, wherein said data that identifies said accessing party comprises information that identifies a business.

92. The method as in claim 85, wherein said data that identifies said accessing party comprises information that identifies an organization.

93. The method as recited in claim 85 wherein said data that identifies said accessing party is sent to an e-mail address.

94. The method as recited in claim 85 further including the step of sending said identifying data for identifying the accessing party.

* * * * *